United States Patent [19]

McKibben

[11] Patent Number: 4,598,234
[45] Date of Patent: Jul. 1, 1986

[54] DIGITAL IMAGE CORRECTION CIRCUIT FOR CATHODE RAY TUBE DISPLAYS

[75] Inventor: Barry A. McKibben, Beaverton, Oreg.

[73] Assignee: Tektronix, Inc., Beaverton, Oreg.

[21] Appl. No.: 614,509

[22] Filed: May 29, 1984

[51] Int. Cl.<sup>4</sup> ............................................ H01J 29/56
[52] U.S. Cl. ..................................... 315/370; 315/382; 315/367; 358/158; 331/57; 307/271
[58] Field of Search ............... 315/370, 382, 367, 368; 358/158, 159; 331/179, 57, DIG. 3; 365/233, 236; 307/271

[56] References Cited

U.S. PATENT DOCUMENTS

| | | | |
|---|---|---|---|
| 3,852,640 | 12/1974 | McCarthy | 315/382 |
| 3,982,193 | 9/1976 | Maringer | 307/271 |
| 4,099,092 | 7/1978 | Bristow | 315/367 |
| 4,189,784 | 2/1980 | Mendenhall | 365/233 |
| 4,203,051 | 5/1980 | Hallett et al. | 315/367 |
| 4,388,619 | 6/1983 | Beck | 315/382 |

*Primary Examiner*—Theodore M. Blum
*Assistant Examiner*—Cain David
*Attorney, Agent, or Firm*—John Smith-Hill; Robert S. Hulse

[57] ABSTRACT

A digital electron optics correction circuit for correcting the focus and astigmatism in a displayed image on a CRT is disclosed. The circuit includes a clock generator for generating a selected number of pulses between each horizontal blanking synchronization pulse. These clock pulses are then counted by an X-address counter and a first address signal is generated corresponding to a particular horizontal position on the CRT screen for each count of the X-address counter. A pulse generator circuit is also provided which is coupled to receive the vertical blanking synchronization pulses and which provides a selected number of output pulses for each vertical blanking synchronization pulse. A Y-address counter counts the output pulses from the pulse generator circuit and provides a second address signal corresponding to a particular vertical position on the CRT screen for each count. These X- and Y-addresses are then input to focus and astigmatism ROMS which are preprogrammed with an appropriate control correction signal for each X-Y-address. In a first embodiment of the invention, the pulse generator circuit inclues a dividing circuit which is coupled to receive the horizontal blanking synchronization pulses. The dividing circuit then provides an output pulse for every N2 pulses received, and each such output pulse is then utilized to increment the Y-address counter. In a second embodiment, the pulse generator circuit includes a second clock generator for generating N3 pulses between successive vertical blanking synchronization pulses, with each clock pulse being used to increment the Y-address counter. Also disclosed in a specialized clock generator cirucit for generating a preselected number of pulses between successive gating pulses.

17 Claims, 7 Drawing Figures

DIGITAL IMAGE CORRECTION CIRCUIT FOR CATHODE RAY TUBE DISPLAYS

BACKGROUND OF THE INVENTION

This invention relates to image correction of a cathode-ray tube display, and particularly to a digital circuit for dynamic focus and astigmatism correction.

The focusing of an electron beam by electric or magnetic fields in a cathode-ray tube, hereinafter abbreviated CRT, is closely analogous to the focusing of light rays in an optical system. Not surprisingly, the electro-optical system of a CRT is plagued by distortions very similar to those which plague optical systems.

Two of the more troublesome distortions are defocusing and astigmatism. Astigmatism is a focal defect in which the electrons in different axial planes come to focus at different points. Under these conditions the CRT spot is not round, thus causing different trace widths depending upon the direction of the trace. More information concerning the various CRT distortions may be found in the book entitled *The Cathode-Ray Tube* by G. Parr and O. H. Davie, Reinhold, 1959.

A number of schemes have been developed to dynamically correct for image distortions in a CRT. These schemes generally fall into one of two categories, either analog correction systems or digital correction systems. One type of system which is representative generally of the analog approach has been developed by the present inventor and is discussed in U.S. Pat. No. 4,249,112, entitled "Dynamic Focus and Astigmatism Correction Circuit" issued Feb. 3, 1981, assigned to Tektronix, Inc. In that system analog circuitry is relied upon to generate image correction waveforms for dynamic focus and for astigmatism, these waveforms being applied to the CRT to effect the desired corrections. Although in general the waveforms required to correct the image at all points on the CRT screen can be relatively complicated mathematical functions, it is customary to approximate these functions by low order polynomials having either constant or regionally constant coefficients. Hence, the accuracy of the corrections depends on how well these polynomials fit the more complicated mathematical functions which represent the image correction function. The result is that images in some regions of the CRT screen are corrected much better than images in other regions of the screen. Also, this approach as well as analog approaches used by others, does not attempt to obtain optimum focus at a large number of independent points which are relatively uniformly distributed on the screen, an approach which would require much more complicated waveforms than can be represented by a small number of low order polynomials.

Such an approach, however, is the typical one used in digital correction schemes. For example, in U.S. Pat. No. 4,099,092, issued July 4, 1978, entitled "Television Display Alignment System and Method", by Stephen D. Bristow, assigned to Atari, Inc., a preprogrammed set of correction signals is used to correct aberrations at a large number of points on the screen. First, an alignment signal is applied to the CRT deflection plates instead of the normal scan signal, and the position of the beam on the screen is monitored. Then, when the beam is at preselected points, correction signals are computed and stored in digital form in a programmable read only memory or ROM. During normal operation these correction signals are converted to analog form and applied to the CRT to correct aberrations in accordance with scan signals which correspond to the position of the beam on the screen.

A similar approach described in U.S. Pat. No. 3,740,608, issued June 19, 1973 entitled "Scanning Correction Methods and Systems Utilizing Stored Digital Correction Values", by Manber et al., assigned to Alphanumeric Incorporated. There, digital correction values are stored corresponding to the corrections required in particular regions of the CRT screen. As the beam is commanded to a new position on the screen, the appropriate correction value for that region is called from a memory and is converted to an analog correction signal by a digital to analog converter.

Another digital approach is represented by U.S. Pat. No. 3,648,077, issued Mar. 7, 1972, entitled "Digital Cathode-Ray Tube Linearity Corrector" by Jerry Dale Merryman, assigned to Texas Instruments Incorporated. in that approach, the system utilizes digital circuitry to produce a correction factor from X- and Y-coordinate data supplied by a digital computer. The correction factor, which is equivalent to the sum of the squares of the X- and Y-coordinate data, is converted into an analog signal and is multiplied by and added to the analog coordinate signals. This produces the corrected deflection signals to eliminate pin-cushion distortion of images displayed on a CRT screen having an essentially flat surface. A serious drawback to this approach, however, is that it requires knowledge of the analytical form of the correction signal in order to calculate it with the computer. For complicated aberrations such an analytical form is typically unknown, so that the method of Merryman is not generally applicable.

Another approach which combines some of the features of the analog approach and the digital approach is described in U.S. Pat. No. 4,354,143, issued Oct. 13, 1982, entitled "Equipment to Correct Aberrations of a Cathode Ray Beam" by Ian D. Judd, assigned to International Business Machines Corporation. That reference discloses an apparatus by which aberrations are corrected as the beam is scanned across the screen of a CRT by deriving correction signals from stored digital values using the calculus of finite differences. Digital values, which are the initial differences of polynomial correction functions, are stored in memory. Then as the electron beam scans the screen horizontally new values of the correction function are calculated and applied to the CRT for each zone into which the CRT screen has been divided. During line flyback, changes in the correction function due to changes in Y-portion are calculated. Although this approach is more generally applicable than that of Merryman, it still assumes low order polynomials are satisfactory for the correction functions. In addition, the particular scheme for addressing the stored digital values is not disclosed.

Yet another reference which describes a digital correction scheme is U.S. Pat. No. 4,388,619 issued June 14, 1983, entitled "Corrector for Bundle Deflection Distortion in Multibeam Cathode Ray Tubes", by Vernon D. Beck, assigned to International Business Machines Corporation. Although a major concern of that patent is in the use of a split focus coil for correcting distortion due to undesired rotation of an array of electron beams, it discloses a digital correction scheme for applying correction signals to the focus coil which is similar to those already described. Correctional currents are supplied to the split focus coil as a function of the matrix beam displacement on the CRT screen. Correction signal values are stored in a memory, the values corresponding to the two correction currents to be supplied to each half of the split focus coil. An address translation means is then provided which synchronizes the addressing of the memory with the X- and Y-deflection signals to the deflection yoke so that the appropriate portion of the memory is accessed relative to the position of the scan on the CRT screen. There is no disclosure, however, as to the design of such an address translation means.

In each of the above references pertaining to digital correction systems, a significant requirement is that each particular correction signal applied to the CRT correspond to a particular location of the electron beam on the CRT screen. Nevertheless, little effort appears to have been devoted to obtaining a simple addressing apparatus for achieving that correspondence between the correction signals and the beam location.

SUMMARY OF THE INVENTION

In accordance with the preferred embodiments of the invention, a digital electron optics correction circuit is provided for correcting the focus and astigmatism in a CRT. The circuit includes a first clock generator for generating a particular number of clock pulses, e.g. N1, between horizontal blanking synchronization pulses. These clock pulses are counted by an X-address counter which then provides a first address signal corresponding to a particular horizontal region of the CRT screen for each count of the X-address counter. A pulse generator circuit is also provided for generating a particular number of pulses between vertical blanking synchronization pulses, the pulse generator circuit being synchronized with the first clock generator. A Y-address counter then counts the output pulses from the pulse generator circuit and provides a second address signal corresponding to a particular vertical region on the CRT screen for each count of the Y-address counter. These X- and Y-addresses are then input to a focus ROM which is pre-programmed with an appropriate focus control correction signal for each X-Y-address. Correction signals from the focus ROM are then converted to an analog signal by a digital-to-analog converter and applied to the focus control elements of the CRT as the electron beam is swept across the face of the CRT. Similarly, these same addresses are also used to provide astigmatism control by appropriately pre-programming astigmatism ROM's to provide astigmatism correction functions.

In a first embodiment of the invention, the pulse generator circuit includes a dividing circuit which is coupled to receive the horizontal blanking synchronization pulses. The dividing circuit then provides an output pulse for every N2 horizontal blanking synchronization pulses, each output pulse of the divider circuit then being used to increment the Y-address counter. In a second embodiment, the Y-address counter is incremented by pulses from a second clock generator rather than by a divider circuit. In this second embodiment, the second clock generator provides a particular number of clock pulses, e.g. N3, between vertical blanking synchronization pulses, each clock pulse corresponding to a particular vertical region on the CRT screen. In all other respects, however, this second embodiment functions in a manner quite similar to that of the first embodiment.

An important element of this system is the first clock generator which together with a feedback system generates a precise number of pulses, N1, between adjacent horizontal synchronization (gating) pulses. The first clock generator includes a ring oscillator constructed of two monostable multivibrators, the input terminal of the first monostable being coupled through an AND-gate to the complement of the gating pulses and to the complementary output signal of the second monostable, with the output signal, Q, of the first monostable coupled to the X-address counter and with the complementary output signal $\bar{Q}$ of the first monostable coupled to the input terminal of the second monostable. The second monostable includes a second input terminal coupled to a bias control system for adjusting the frequency of the oscillator. The output signal of the X-address counter is then coupled to a decoder which provides a first signal when the X-address counter counts fewer than N1 pulses between successive gating pulses and which provides a second signal when the counter counts precisely N1 pulses. The output signal of the decoder is coupled to one terminal of a first resistor and to a shunt capacitor. The second terminal of the first resistor is then coupled to the input terminal of an integrator and to a biasing resistor which is connected to a voltage source. The output signal of the integrator then provides a signal to the bias control system for decreasing the frequency of the oscillator if the output of the counter reaches N1 counts before being reset by the gating pulse, and for increasing the frequency if the output of the counter does not reach N1 counts before being reset by the gating pulse. In the second embodiment, the design of the second clock generator is very similar to that of the first clock generator, the primary difference being related to the fact that it operates at a different frequency and has a feedback system designed to decode a different number of counts.

DETAILED DESCRIPTION OF THE INVENTION

Figure 1:
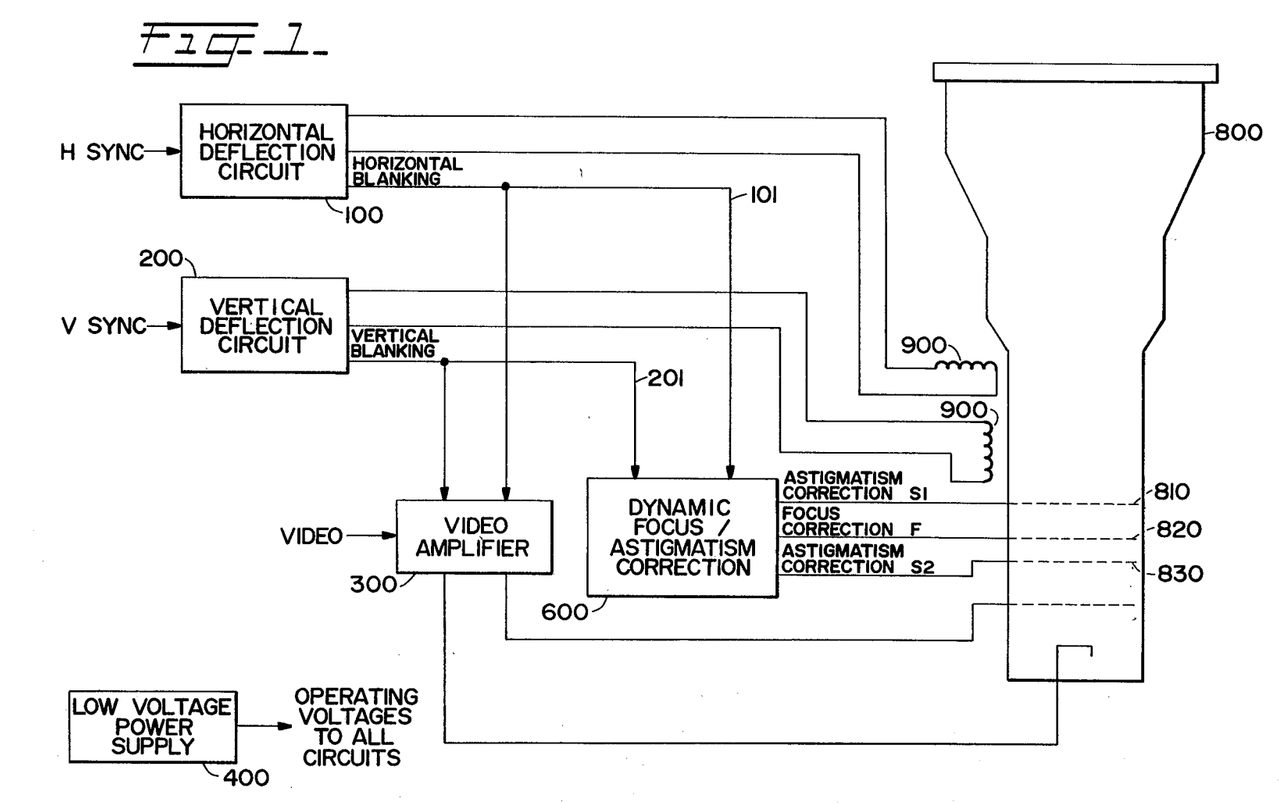
FIG. 1 is a block diagram of a CRT device illustrating the relationship of a dynamic focus and astigmatism correction system to the horizontal deflection circuit, and the vertical deflection circuit.

Illustrated in FIG. 1 is a block diagram of a system according to the invention. Horizontal and vertical synchronizing signals are first fed to deflection circuits 100 and 200, respectively. The deflection circuits process the input signals and provide current ramp output signals for driving deflection yoke 900. Also provided are horizontal and vertical blanking pulses for blanking the beam appropriately between successive traces. The video amplifier controls display intensity by providing a voltage to the control grid of CRT 800. Power supply 400 provides the various voltages necessary for operation of the system.

Horizontal deflection circuit 100 and vertical deflection circuit 200 are coupled to a dynamic focus and astigmatism correction system 600 by means of lines 101 and 201 respectively, which provide the horizontal and vertical blanking pulses used for synchronizing the correction waveforms. Correction system 600 generates a focus correction signal F which is applied to focus elements 820, and two astigmatism correction signals S1 and S2 which are applied to stigmators 810 and 830, respectively. These stigmators are generally conventional quadrupole stigmators oriented at 45 degrees relative to each other in order to be able to correct the ellipticity of the electron beam spot in all directions in the plane of the CRT faceplate.

Figure 2:
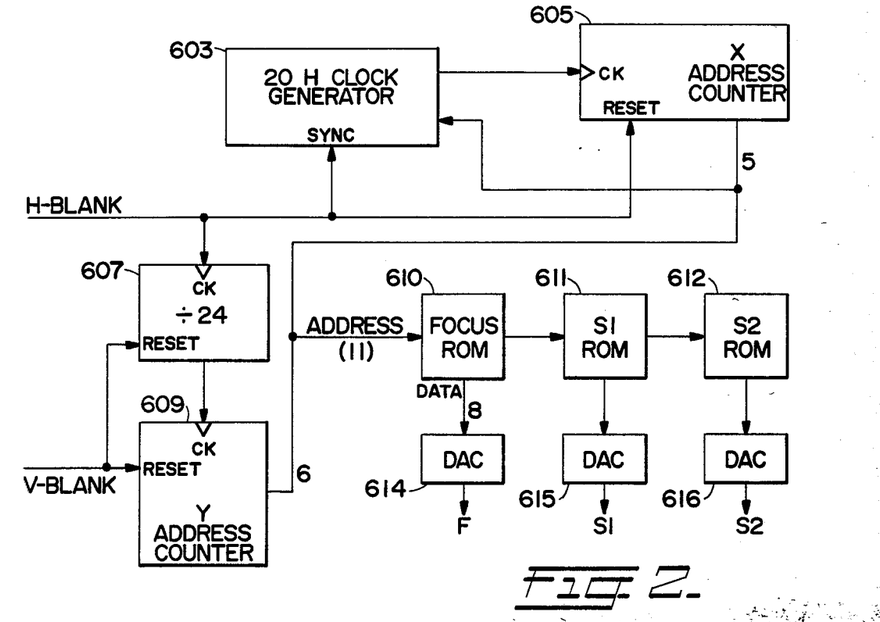
FIG. 2 is a block diagram of a first embodiment of the dynamic focus and astigmatism correction system according to the invention.

FIG. 2 is a detailed block diagram of the dynamic focus and astigmatism correction system 600 according to a first embodiment of the invention. In this embodiment, each horizontal blanking synchronization pulse, H-blank, triggers a clock generator 603, which produces a number of evenly spaced pulses between successive H-blank pulses. (See FIG. 4). These clock pulses drive an X-address counter 605 which is used to generate the X-axis portion of the address for each of focus ROM 610, stigmator S1 ROM 611, and stigmator S2 ROM 612. In the illustrated embodiment, the clock generator is designed to provide twenty clock pulses during each horizontal active period. Hence, between successive H-Blank pulses, the ROM's are accessed twenty times corresponding to twenty points along the horizontal axis of the CRT screen. Each H-Blank pulse is also used to reset X-address counter 605 and to drive a divide-by-twenty-four circuit 607. This latter circuit in turn drives a Y-address counter 609, which advances the Y-axis portion of the address of ROM's 610, 611, and 612 after every twenty-four horizontal lines are swept on the CRT (i.e., upon the occurrence of every twenty-fourth H-Blank pulse). In a typical system, the CRT displays 1536 horizontal lines, so that the Y-field corresponds to 1536/24=64 sequential Y-addresses in this specific embodiment. The Y-address counter 609 and divider circuit 607 are reset by each vertical blanking synchronization pulse, V-Blank, which occurs once for every 1536 H-Blank pulses. The ROMs are programmed to provide the desired correction signals for each region so defined across the face of the CRT. Hence, unique focus and astigmatism correction voltages are obtained for each of 1280 (20×64) regions of the CRT screen. Corrections on the CRT screen are made by using the data output from the ROMs to drive digital-to-analog converters 614, 615, and 616, which produce the amplified correction signals, F, S1 and S2, for focus element 820 and stigmators 810 and 830, respectively.

Figure 3:
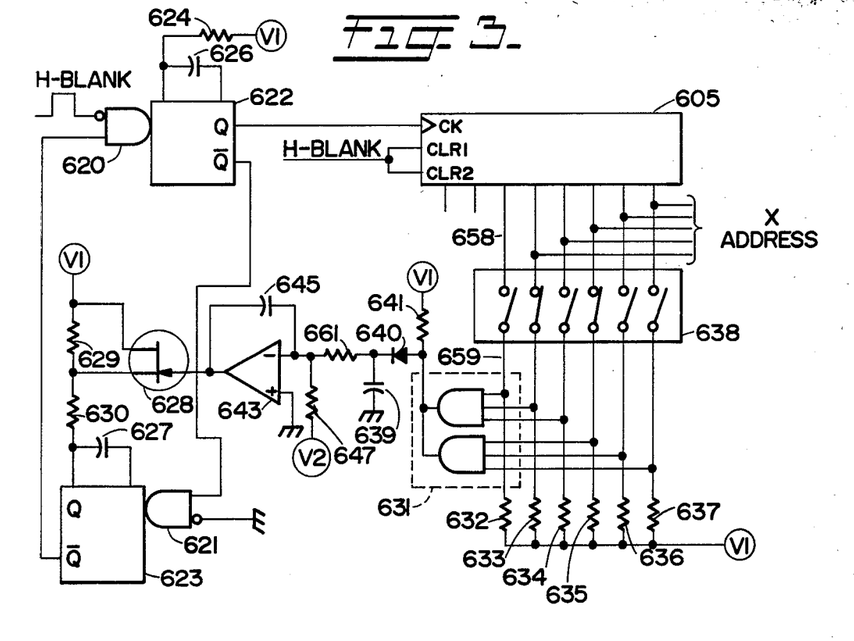
FIG. 3 shows the details of a first clock generator used in the dynamic focus and astigmatism correction system.

FIG. 3 is a schematic illustrating a feedback system for clock generator 603 which is designed to produce precisely twenty evenly spaced pulses during the active horizontal period. For the illustrated system the H-Blank signal is inverted and applied to one input terminal of an AND-gate 620, the output signal of which is used to trigger a monostable multivibrator 622. The complementary output signal, $\overline{Q}$, of monostable 622 is then used to trigger another identical monostable 623 via AND-gate 621. The complementary output signal, $\overline{Q}$, of monostable 623 is then routed to the second input terminal of AND-gate 620, so that the two monostables together form a gated ring oscillator. When the H-Blank signal goes to a low logic level, i.e., at the trailing edge of the H-Blank pulse, monostable 622 is triggered on, which in turn triggers monostable 623, which in turn triggers monostable 622 and so forth. The oscillator pulse width is determined by the RC time constant of timing resistor 624 and timing capacitor 626, while the oscillator frequency is determined by the bias provided by field effect transistor (FET) 628, timing resistors 629 and 630, and timing capacitor 627.

Unlike conventional oscillators which are designed to achieve a constant frequency, such as in phase-locked loop systems, the system in this embodiment uses a gated oscillator to consistently achieve twenty pulses between the falling edge of a horizontal blanking synchronization pulse, and the rising edge of the next horizontal blanking synchronization pulse even though the frequency or duration of the H-Blank signal may vary somewhat over time. To accomplish this result, a feedback system is provided between X-address counter 605 (e.g., 74LS393) and FET 628. In the illustrated embodiment, the Q-output signal of monostable 622 is applied to the clock terminal of counter 605 and the H-Blank signal is coupled to counter 605 to reset it on every blanking synchronization pulse. The output lines of counter 605 which are coupled to the X-axis address lines (which are connected to the ROMs 610-612), are also routed to a decoder 638, shown here as a switch decoder, set to decode the number "20" (i.e., 010100 in binary). The output signals of the switch decoder are then coupled to the input terminals of AND-gate 631 and to a voltage source V1 through pull-up resistors 632 through 637, so that when all 6 inputs are at a high logic level, as happens when the trailing edge of the twentieth pulse is received before the counter is reset, the output signal of AND-gate 631 goes to a logic high thus charging up capacitor 639 through a diode 640. The charging of capacitor 639 increases the voltage at the inverting input terminal of an operational amplifier 643, the voltage being determined by the charging rate of capacitor 639. Operational amplifier 643 and capacitor 645 together form an integrator, so that when the voltage at the inverting input terminal to the operational amplifier increases, the output signal of the integrator begins to ramp downward, thereby reverse biasing the gate of FET 628. This in turn reduces the FET's conductivity, which is equivalent to having a larger timing resistor 629 for monostable 623, thereby increasing the period of the ring oscillator so that during the next period between H-Blank pulses the trailing edge of the twentieth pulse of the ring oscillator does not occur before the counter is reset by the H-Blank signal.

In those situations where the twentieth pulse does not occur before the next H-Blank signal, resistor 647, of the order of 8.2 Megohms, causes the input voltage to the integrator to drift slowly upward thereby decreasing the reverse bias on the FET until twenty counts are obtained. In the former situation, however, the output signal of AND-gate 631 overrides the effects of resistor 647 when the twentieth count has occurred. Hence the effect of the feedback system is to make the falling edge of the twentieth pulse coincident with the rising edge of the next H-Blank pulse. (See FIG. 4.)

As illustrated in this embodiment, AND-gate 631 is implemented using two open collector TTL-gates, such as 74LS15's, with their output terminals tied together and to an external pull-up resistor 641. In the illustrated embodiment, pull-up resistors 632 through 637 and 641 are approximately 1 kohm and are tied to voltage source V1 which is approximately 5 volts. Voltage source V2 in this embodiment is selected to be −15 volts, and input resistor 661 is about 1 kohm. Capacitor 639 is chosen to be about 0.01 microfarads. Although to obtain a count of 20 requires only five binary numbers (10100), a 6-bit counter such as a 74LS393 is used in this embodiment with one line left open, shown here as line 658. Since gate 631 implemented with 74LS15s has six input terminals, one input line of the gate, line 659, is tied to the 5 volt source V1 through resistor 632 so that the input terminal is not left floating. Also, the ring oscillator made up of AND-gate 620 and monostable 622 together with AND-gate 621 and monstable 623 is implemented using a single monolithic chip such as a 74LS221 which has dual multivibrators.

Figures 4, 6:
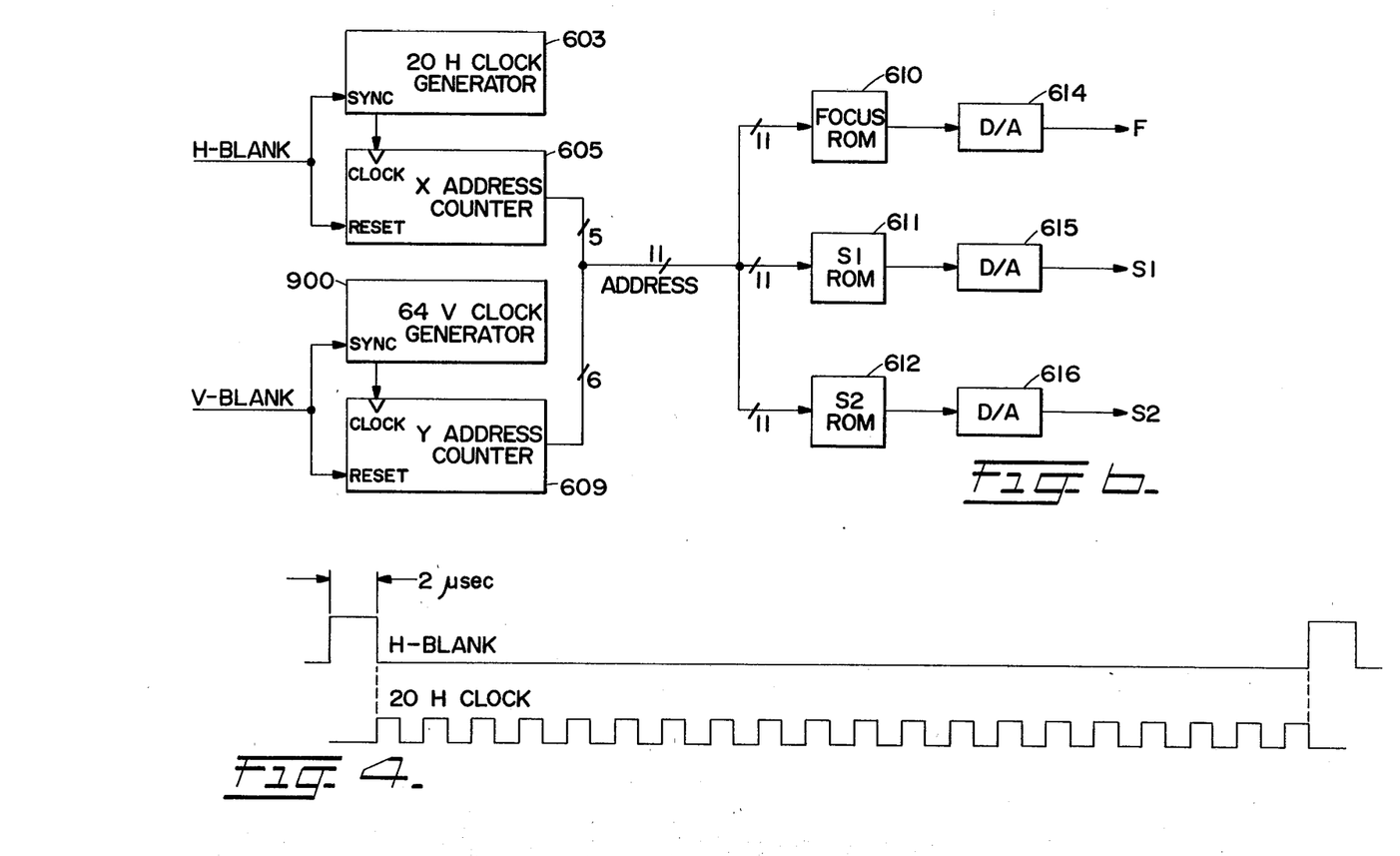
FIG. 4 shows a timing diagram illustrating the relationship between horizontal blanking synchronization pulses and the output of the first clock generator.
FIG. 6 is a block diagram of a second embodiment of the dynamic focus and astigmatism correction system according to the invention.
Figure 5:
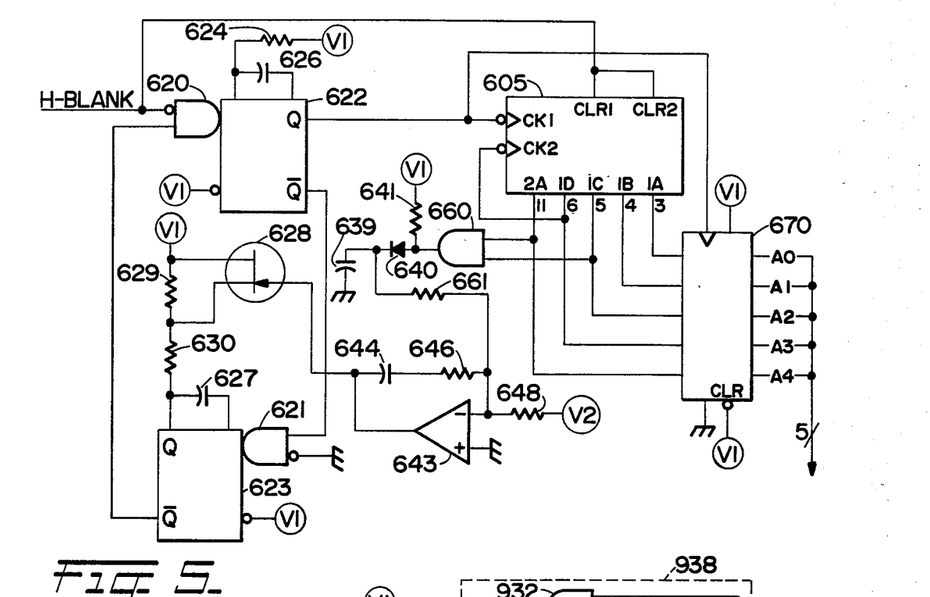
FIG. 5 is a schematic of an alternative embodiment of the first clock generator for use in the dynamic focus and astigmatism correction system.

Shown in FIG. 5 is an alternative embodiment of a feedback system for clock generator 603 which is similar to that of FIG. 4. In this alternative embodiment, it is recognized that only two bits are necessary to decode the number 20, the third significant bit (corresponding to the signal generated on bit line 5 of 605) and the fifth significant bit (corresponding to the signal generated on bit line 11 of 605), since the number 20 is represented by 10100 in binary. Hence, the decoding can be accomplished readily by a single AND-gate 660 having two input terminals as shown. Another difference between this embodiment and that shown in FIG. 4 is that the output address signals from X-address counter 605 are latched on each clock pulse by a latch 670. This helps to stabilize the X-address signals being provided to the ROM's. Another feature of this implementation is to include a stabilization resistor 646 in the feedback loop of the integrator. In the experimental implementation of this alternative embodiment, capacitor 644 was chosen to be 0.010 micro-farads, and resistor 646 was chosen to be 1.5 kohms. Also, resistor 648 was chosen to be 9.1M ohms.

Figure 7:
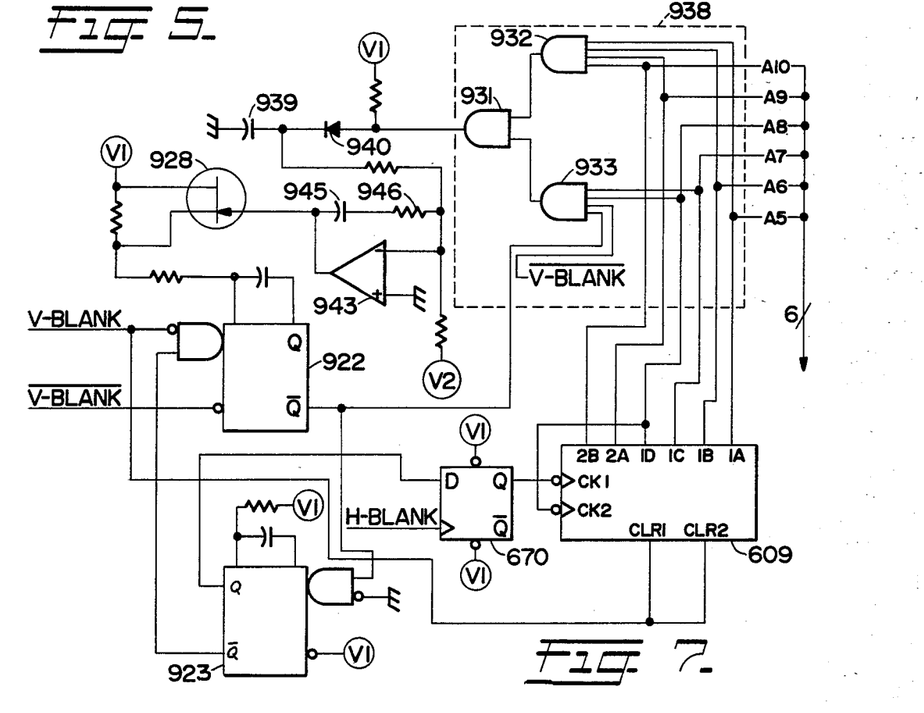
FIG. 7 is a schematic of a second clock generator for use in the second embodiment shown in FIG. 6.

Shown in FIG. 6 is a block diagram of a second embodiment of the invention which uses an independent clock generator 900 for generating pulses to drive Y-address counter 609. This second embodiment is identical to that shown in FIG. 2, except that the divide-by-twenty-four circuit 607 has been replaced by clock generator 900 in order to achieve independent control over the Y-address corrections. FIG. 7 is a schematic of a preferred embodiment of clock generator 900 illustrating its relationship to the Y-address counter 609. As shown, clock generator 900 in this embodiment is very similar to the clock generator shown in FIG. 5 and includes a ring oscillator made up of two monostable multivibrators 922 and 923, with the oscillator frequency being controlled by FET 928. Also, in a manner similar to that discussed earlier, the conductance of FET 928 is controlled by the output signal from an integrator which includes operational amplifier 943, capacitor 945 and resistor 946. Unlike the previous embodiments, the output signal Q from monostable 923 of the ring oscillator is routed to the input terminal of a D flip-flop 670 which is clocked by the H-Blank signal. The Q output signal from flip-flop 670 is then utilized as the input signal to the Y-address counter 609. This configuration ensures that the vertical address does not change while the electron beam is writing on the CRT screen.

The particular frequency chosen for the ring oscillator shown in FIG. 7 is determined by the number of correction regions selected for the Y-field. In this particular embodiment, the number of regions is chosen as 64, which is the same as that chosen for the previous embodiment shown in FIG. 2. In order to achieve 64 addresses between vertical blanking synchronization pulses, a decoder 938 made up of AND-gates 931, 932, and 933 is configured to decode the number 63 i.e. 111111 in binary. Unlike the embodiments of FIGS. 3 and 5 which decode on the falling edge of the last clock pulse from the ring oscillator, in this embodiment the decoder is delayed in its response until the rising edge of the next pulse (i.e. the 64th pulse) in order to ensure that the output signal from the counter is well settled before initiating the feedback signal to the ring oscillator. This delay is achieved by using the output signal $\overline{Q}$ of monostable 922 as an input signal to AND-gate 933, the $\overline{Q}$ signal thereby acting to enable AND-gate 933 at the rising edge of each clock pulse.

Another signal which is input to the decoder is the complement of the V-Blank pulse, $\overline{\text{V-Blank}}$. This signal acts to turn the decoder off precisely by avoiding the propagation delay in clearing counter 609.

While preferred embodiments of the present invention have been shown and described above, it will be apparent to those skilled in the art that many changes and modifications may be made without departing from the invention in its broader aspects. For example, it should be clear that the screen could be divided into some number of regions other than 20×64. Similarly, the specific part numbers and magnitudes of the various circuit values are offered only as examples to illustrate the relationships between various circuit elements in order to provide an operative device. Also, those skilled in the art will appreciate that three separate ROM's are not required, since all three correction functions could be supplied by a single ROM. Furthermore, focus corrections and astigmatism corrections can be carried out independently, for example, focus corrections might be carried out using the invention described above, while astigmatism corrections might be carried out using conventional analog techniques, or vice versa.

What is claimed is:

1. A gated oscillator for providing a plurality N1 of pulses between gating pulses, comprising:

clock means having an output terminal for providing a sequence of clock pulses with a frequency f, said clock means gated by said gating pulses;

counter means having an input terminal coupled to said output terminal of said clock means for counting said clock pulses and for providing counter output signals corresponding to the number of pulses counted between gating pulses, said counter means being reset on each gating pulse;

decoder means having an input terminal coupled to said counter means for receiving said counter output signals and having an output terminal for providing a first decoder output signal when said counter means counts fewer than N1 pulses, and for providing a second decoder output signal when said counter means counts N1 pulses; and bias means coupled to said clock means and to said decoder means for decreasing said frequency f if said counter means reaches N1 counts before being reset by said gating pulse, and for increasing said frequency f if said counter does not reach N1 counts before being reset by said gating pulse.

2. A device as in claim 1 wherein said clock means comprises a ring oscillator including:
first gate means having a first input terminal, a second input terminal and a first gate output terminal, said first gate means for receiving said gating signal at said first input terminal, for receiving a second signal at said second input terminal, and for providing a first gate output signal corresponding to the Boolean AND function of the complement of said gating signal and said second signal;
a first monostable multivibrator for providing a first complementary output signal $\overline{Q}_1$ in response to said first gate output signal;
second gate means coupled to receive said signal $\overline{Q}_1$ for providing a second gate output signal which corresponds to a high logic level when said signal $\overline{Q}_1$ has a high logic level, and which corresponds to a low logic level when said signal $\overline{Q}_1$ has a low logic level;
a second monostable multivibrator having a second multivibrator output terminal for providing a complementary output signal $\overline{Q}_2$ in response to said second gate output signal, with said second multivibrator output terminal coupled to said second input terminal of said first gate means for supplying said complementary output signal $\overline{Q}_2$ as said second signal to said first gate means; and
one of said first and second monostable multivibrators coupled to receive signals from said bias means for varying the time between clock pulses of the ring oscillator.

3. A device as in claim 2 wherein bias means comprises:
a capacitor having a first terminal coupled to said output terminal of said decoder means and a second terminal coupled to ground;
a first resistor having a first terminal and a second terminal with said first terminal coupled to said first terminal of said capacitor;
a second resistor having a first terminal coupled to said second terminal of said first resistor, and having a second terminal disposed to be coupled to a voltage source providing a voltage lower in value than the voltage level of either one of said first and second decoder output signals;
integrator means coupled to said second terminal of said first resistor and having an output terminal, said integrator means for integrating signals present at said second terminal of said first resistor, and for providing said integrated signals at said output terminal;
a field-effect transistor having a gate, a source, and a drain, with said gate coupled to said output terminal of said integrator; and
a third resistor coupled between said source and drain, and coupled to said biasing input of said second monostable multivibrator.

4. A digital electron optics correction circuit for providing image correction signals in a display system having a CRT with a screen and image correction elements, and having horizontal and vertical sweep synchronization circuits for providing horizontal and vertical blanking synchronization signals, the horizontal and vertical blanking synchronization signals being in substantially synchronized relationship and each comprising a sequence of pulses, and the circuit, comprising:
first clock generator means for generating N1 pulses between pulses of the horizontal blanking synchronization signal;
an X-address counter coupled to said first clock generator means for counting said N1 pulses and for providing a first address signal corresponding to a particular horizontal position on said CRT screen for each count of said X-address counter, said counter being reset on each pulse of the horizontal blanking synchronization signal;
pulse generator means for generating N3 pulses between pulses of the vertical blanking synchronization signal;
a Y-address counter coupled to said pulse generator means for counting output pulses from said pulse generator means and for providing a second address signal corresponding to a particular vertical position on said CRT screen for each count of said Y-address counter; and
image correction means coupled to said X- and Y-address counters for receiving said first and second address signals and for providing image correction signals in response thereto,
and wherein said first clock generator means comprises first clock means having an output terminal for providing a sequence of clock pulses with a frequency f, said first clock means being gated by the horizontal blanking synchronization signal and having a control terminal for receiving a signal that is effective to adjust said frequency f, and feedback means connected between said output terminal and said control terminal and operative to decrease said frequency f if said X-address counter reaches N1 counts before being reset by the horizontal blanking synchronization signal, and to increase said frequency f if said X-address counter does not reach N1 counts before being reset by the horizontal blanking synchronization signal.

5. A circuit as in claim 4 wherein said image correction means includes a digital-to-analog converter coupled to said image correction elements for converting said image correction signals to first analog signals, and for providing those signals to said image correction elements.

6. A circuit as in claim 4 wherein said image correction means includes a focus ROM coupled to said image correction elements for providing focus correction signals in response to said first and second address signals.

7. A circuit as in claim 6 wherein said image correction means further includes a first astigmatism ROM coupled to said image correction elements for providing first astigmatism correction signals in response to said first and second address signals.

8. A circuit as in claim 7 wherein said image correction means further includes a second astigmatism ROM coupled to said image correction elements for providing second astigmatism correction signals in response to said first and second address signals.

9. A circuit as in claim 4 wherein said image correction means includes a first astigmatism ROM coupled to said image correction elements for providing first astigmatism correction signals in response to said first and second address signals.

10. A circuit as in claim 9 wherein said image correction means further includes a second astigmatism ROM coupled to said image correction elements for providing second astigmatism correction signals in response to said first and second address signals.

11. A circuit as in claim 4 wherein said feedback means comprises:
  decoder means coupled to receive said first address signal for providing a first decoder output signal when said X-address counter counts fewer than N1 pulses, and for providing a second decoder output signal when said X-address counter counts N1 pulses; and
  bias means coupled to said first clock means and to said X-address counter.

12. A circuit as in claim 11 wherein said first clock means further comprises:
  first gate means having a first input terminal, a second input terminal and a first gate output terminal, said first gate means for receiving said horizontal blanking synchronization signal at said first input terminal, for receiving a second signal at said second input terminal, and for providing a first gate output signal corresponding to the Boolean AND function of the complement of said horizontal blanking synchronization signal and said second signal;
  a first monostable multivibrator for providing a first complementary output signal $\overline{Q_1}$ in response to said first gate output signal;
  second gate means coupled to receive said signal $\overline{Q_1}$ for providing a second gate output signal which corresponds to a high logic level when said signal $\overline{Q_1}$ has a high logic level, and which corresponds to a low logic level when said signal $\overline{Q_1}$ has a low logic level; and
  a second monostable multivibrator having a second multivibrator output terminal for providing a complementary output signal $\overline{Q_2}$ in response to said second gate output signal, with said second multivibrator output terminal coupled to said second input terminal of said first gate means for providing said signal $\overline{Q_2}$ as said second signal to said first gate means,
  and wherein one of said first and second monostable multivibrators is coupled to receive signals from said bias means for varying the time between adjacent clock pulses.

13. A circuit as in claim 12 wherein said bias means comprises:
  a capacitor having a first terminal coupled to said output of said decoder means and a second terminal coupled to ground;
  a first resistor having a first terminal and a second terminal with said first terminal coupled to said first terminal of said capacitor;
  a second resistor having a first terminal coupled to said second terminal of said first resistor, and having a second terminal disposed to be coupled to a voltage source providing a voltage lower in value than the voltage level of either one of said first and second decoder output signals;
  integrator means coupled to said second terminal of said first resistor and having an output terminal, said integrator means for integrating signals present at said second terminal of said first resistor, and for providing said integrated signals at said output terminal;
  a field-effect transistor having a gate, a source, and a drain, with said gate coupled to the output terminal of said integrator; and
  a third resistor coupled between said source and drain, and coupled to said biasing input of said second monostable multivibrator.

14. A circuit as in claim 4 wherein said pulse generator means comprises:
  second clock means having an output terminal for providing a sequence of clock pulses having a frequency w, said second clock means being gated by said vertical blanking synchronization signal;
  second decoder means coupled to receive said second address signal for providing a first signal when said Y-address counter counts fewer than N3 pulses, and for providing a second signal when said Y-address counter counts N3 pulses; and
  bias means coupled to said second clock means and to said Y-address counter for decreasing the frequency w if said Y-address counter reaches N3 counts before being reset by said vertical blanking synchronization signal, and for increasing said frequency w if said Y-address counter does not reach N3 counts before being reset by said vertical blanking synchronization signal.

15. A circuit as in claim 4 wherein said pulse generator means comprises a dividing circuit having an input terminal for receiving said horizontal blanking synchronization signal, and for providing an output for every N2 pulses of the horizontal blanking synchronization signal, said dividing circuit being reset on each pulse of the vertical blanking synchronization signal.

16. A display system having a dispaly screen, means for forming a visible dot on the display screen, means for deflecting the visible dot over the display screen in directions parallel to first and second mutually-perpendicular axes under control of first and second synchronization signals respectively, said first and second synchronization signals being in substantially synchronized relationship and each comprising a sequence of pulses, and a digital electron optics correction circuit for providing image correction signals, said circuit comprising:
  first clock generator means for generating N1 pulses between pulses of the first synchronization signal;
  a first address counter coupled to said first clock generator means for counting said N1 pulses and for providing a first address signal corresponding to a particular position of the visible dot in a direction parallel to the first axis for each count of the first address counter, said counter being reset on each pulse of the first synchronization signal;
  pulse generator means for generating N3 pulses between pulses of the second synchronization signal;
  a second address counter coupled to the pulse generator means for counting output pulses from the pulse generator means and for providing a second address signal corresponding to a particular position of the visible dot in a direction parallel to the second axis for each count of the second address counter; and
  image correction means coupled to the first and second address counters for receiving the first and second address signals and for providing image correction signals in response thereto,
  and wherein said first clock generator means comprises first clock means having an output terminal for providing a sequence of clock pulses with a frequency f, said first clock means being gated by the first synchronization signal, decoder means coupled to receive the first address signal for providing a first decoder output signal when the first address counter counts fewer than N1 pulses, and for providing a second decoder output signal when the first address counter counts N1 pulse, and bias means coupled to the first clock means and to the first address counter for decreasing the frequency f if the first address counter reaches N1 counts before being reset by the first synchronization signal, and for increasing the frequency f if the first address counter does not reach N1 counts before being reset by the first synchronization signal.

17. A gated oscillator for providing a predetermined number N of pulses between consecutive gating pulses, comprising:

clock means having an output terminal for providing clock pulses at a frequency f, said clock means being gated by said gating pulses and having a control terminal for receiving a signal that is effective to adjust said frequency f;

counter means having an input terminal coupled to the output terminal of said clock means for counting said clock pulses and for providing a counter output signal representative of the number of pulses counted since the immediately preceeding gating pulse, said counter means having a reset terminal for receiving the gating pulses; and feedback means connected to receive the counter output signal of the counter means and being connected to the control terminal of the clock means, said feedback means being operative to decrease said frequency f if the counter means reaches N counts before being reset by the gating pulse and to increase said frequency f if said counter means is reset by a gating pulse before reaching N counts.

* * * * *